United States Patent
Taylor et al.

(10) Patent No.: US 8,670,959 B2
(45) Date of Patent: Mar. 11, 2014

(54) PROCESSING AND DISPLAY OF A REAL WORLD MODEL

(75) Inventors: Richard Taylor, Bristol (GB); Chris Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2415 days.

(21) Appl. No.: 11/494,292

(22) Filed: Jul. 26, 2006

(65) Prior Publication Data

US 2009/0055144 A1   Feb. 26, 2009

(30) Foreign Application Priority Data

Oct. 11, 2005  (GB) .................................. 0517558.3

(51) Int. Cl.
*G06F 17/10* (2006.01)
(52) U.S. Cl.
USPC ............................................................. 703/2
(58) Field of Classification Search
USPC ............................................................. 703/2
See application file for complete search history.

(56) References Cited

U.S. PATENT DOCUMENTS

2004/0093585 A1   5/2004   Christodoulou et al. ...... 717/104

OTHER PUBLICATIONS

Brown et al.; Scale-sensitivity, Fractal Analysis and Simulations; Int J. Mach Tools Manufact. vol. 38, Nos. 5-6. pp. 633-637, 1998.*
Sotskov et al.; Some concepts of stability analysis in combinatorial optimization; Discrete Applied Mathematics 58 (1995) 169-190.*
Lloyd et al. On the need to determine appropriate domains for hydrology-slope stability models; Advances in Environmental Research 8 (2004) 379-386.*
Choi et al.; Use of multi-parameter sensitivity analysis to determine relative importance of factors influencing natural attenuation of mining contaminants; Water Resource Res, 2000; pp. 1-7.*
Bosan S. et al. "A Visualization-Based Analysis Method for Multiparameter Models of Capillary Tissue-Exchange" Annals of Biomedical Engineering, (1996), vol. 24, pp. 124-138.*
Vetschera et al. "A process-oriented framework for the evaluation of managerial support systems" ELSEVIER Information & Management 28 (1995) 197-213.*

* cited by examiner

*Primary Examiner* — Hugh Jones

(57) ABSTRACT

An analysis method takes an input model of a real world process with an output parameter, with multiple input parameters. The complexity of regions of the model is determined to locate regions of low complexity, that is to say low sensitivity of the output parameters to the input parameters. The input parameters may be ordered and the results displayed on view of a two dimensional surface starting with the first parameter and ending with the last. The display may represent the value of the output parameter by the length of a bar on the relevant part of the two dimensional surface. A combination of automatic parameter ordering and/or user input may be used to locate suitable regions.

16 Claims, 3 Drawing Sheets

PROCESSING AND DISPLAY OF A REAL WORLD MODEL

FIELD OF INVENTION

The invention relates to an analysis method and apparatus for a real world model, and a computer program product implementing the same

RELATED ART

The field of operational analysis of models of the real world is reasonably well known, and aims to identify best solutions of those models, frequently by using mathematical techniques that seek the maximum or minimum of some parameter, such as cost or throughput.

Unfortunately, real world models are never exact representations of the systems they are trying to model so attempts to use solutions found by such operational analysis often leads to unexpected results that can frequently be much worse than those suggested by the model.

SUMMARY OF INVENTION

According to a first aspect of the invention there is provided an analysis method, including: accepting an input model of a real-world process defining the relationship between a plurality of parameters, including n input parameters which may be varied and at least one output parameter representing an aspect of the quality of the system, where n is at a positive integer; estimating the complexity of regions of the multidimensional space of input parameters, wherein the complexity is a measure of the sensitivity of the output parameters to the input parameters; and locating regions of the model where the output parameter is relatively insensitive to variations in the input parameters.

By a region of the model that is "relatively insensitive" to variations in the input parameters is meant a region of the input parameters determined by m input parameters being held fixed (m<n) in which the variation of the other (n−m) input parameters varies the output less than other sets of m input parameters. In particular, the located region may have a variation of the output parameter with variation of the other (n−m) input parameters less than 90% of all possible other sets of m input parameters, preferably less than 99% of all possible other sets of m input parameters, and in a particularly preferred embodiment less than all possible other sets of m input parameters, for selected different possible values of all input parameters.

In embodiments, the analysis method includes: ordering the input parameters in an initial order from a first input parameter to a last input parameter; varying the input parameters in order starting with the first input parameter and ending with the last input parameter, each parameter taking a plurality of values in turn, and calculating the value of each output parameter for each set of input parameters; varying the order of input parameters; and changing the order of input parameters to identify an order of input parameters having a set of earlier input parameters being the first m input parameters where m is a positive integer and less than m and a set of later input parameters being the rest of the n input parameters, in which there is at least one region defined by a set of values of the m earlier input parameters in which the variation of the later input parameters varies the output parameters less than the variation at least 90% of other sets of m earlier input parameters in the other possible orderings of the input parameters.

In embodiments, the method further includes the steps of:
identifying a region of the input parameters for which the sensitivity of the values of the output parameters to the input parameters is small;
selecting new values of input parameters corresponding to the identified region; and
identifying a region of the new values of the input parameters of the model where the output parameter is relatively insensitive to variations in the input parameters.

These steps may be repeated. In this way, a good set of values of the input parameters can be obtained using only a coarse set of values initially and refining the values.

In other aspects, there is provided analysis apparatus for carrying out the method and a computer program product.

BRIEF DESCRIPTION OF DRAWINGS

For a better understanding, and purely by way of example, an embodiment of the invention will now be described with reference to the accompanying drawings, in which.

DETAILED DESCRIPTION

In the embodiments, a model of a real-world process is provided. The present patent application is not particularly concerned with the production of such models. A number of techniques are known and used which can generate such models, including for example that described at US2004/0093585 and references in that document which are incorporated herein by reference.

Figure 1:
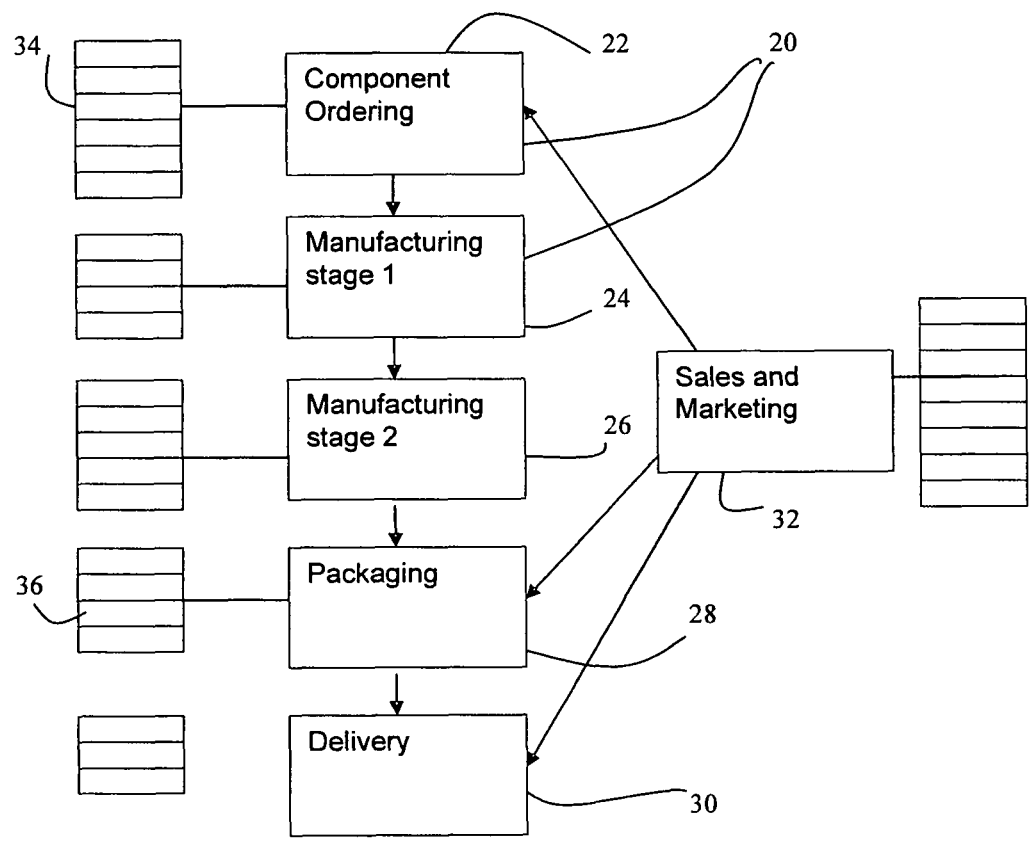
FIG. 1 illustrates a real world model used as an example.

As a specific example, the first embodiment will be described with respect to a supply chain for delivering a product, as illustrated in FIG. 1. The supply chain can be modelled by a number of stages 20, including for example a component ordering stage 22, two manufacturing stages 24, 26, a packaging stage 28, a delivery stage 30, and a sales and marketing stage 32. The stages do not necessarily follow one another, and FIG. 1 shows that the sales and marketing stage provides inputs to a number of other stages.

Each stage will have a number of parameters 34 describing its operation. For example, one of the parameters of a packaging stage can be the packaging rate 36, which might take a value from 1 per minute to 100 per minute. Some of the stages will have more parameters than other stages.

One problem with such models is that the number of input parameters can be large. In the example, there may be six stages, a total of thirty parameters, and one hundred different possible values for each of those parameters, for example a packaging rate of 1 per minute to 100 per minute in units of 1. Thus, the model is represented by a multi-dimensional space of 30 dimensions and 100 values in each dimension, which would lead to an enormous number of calculations (well in excess of $10^{60}$) if it were needed to evaluate the model for each possible set of input parameters.

Another problem with such models is that it can be very difficult to visualise the results, since the human brain is not naturally adapted to thinking in 30 dimensions.

According to the first embodiment, one or two parameters are identified as being a measure of the quality of the system. These parameters are known as "output parameters" in the following. For example, in the supply chain example, the output parameters may be units delivered and cost per unit delivered.

A set of parameters is identified as the input parameters. This set may include all of the parameters apart from the output parameters, or a subset of the parameters. In the supply chain example, this will include the packaging speed as well as all other parameters other than the input parameters.

The inventors have realised that it is often more important to find a stable solution that can be relied upon than to find an optimal solution that is sensitive to input parameters.

Conventional operational analysis generally seeks maxima or minima, i.e. in the example conventional operational analysis would seek a solution with a maximal throughput and a minimal cost.

The embodiment according to the invention takes a different approach, and aims to locate stable solutions. The reason for this is that models of the type envisaged are never 100% accurate, both in terms of the data supplied into the model and the model itself. Thus, to attempt to operate a real-world system at a maximum or minimal output predicted by the model is very likely to result in a performance significantly worse than that predicted. In contrast, if a stable solution is selected, this is much less dependent on the values of the variables and hence it is much more likely that the result predicted by the model will in fact be achieved.

In the embodiment, the processing starts with a very coarse scale of values for each of the different input parameters.

Then, the input parameters are ordered from a first input parameter to a last input parameter, and selecting a plurality of discrete values for each of the input parameters.

Thus, in the packaging speed example, only four different packaging speeds are selected 2 per minute, 5 per minute, 10 per minute and 50 per minute. Four is a particularly suitable number of parameter values since it fits well with the display method, described below, but other numbers of parameter values may also be used. Values of each of the other parameters are also selected.

Figure 2:
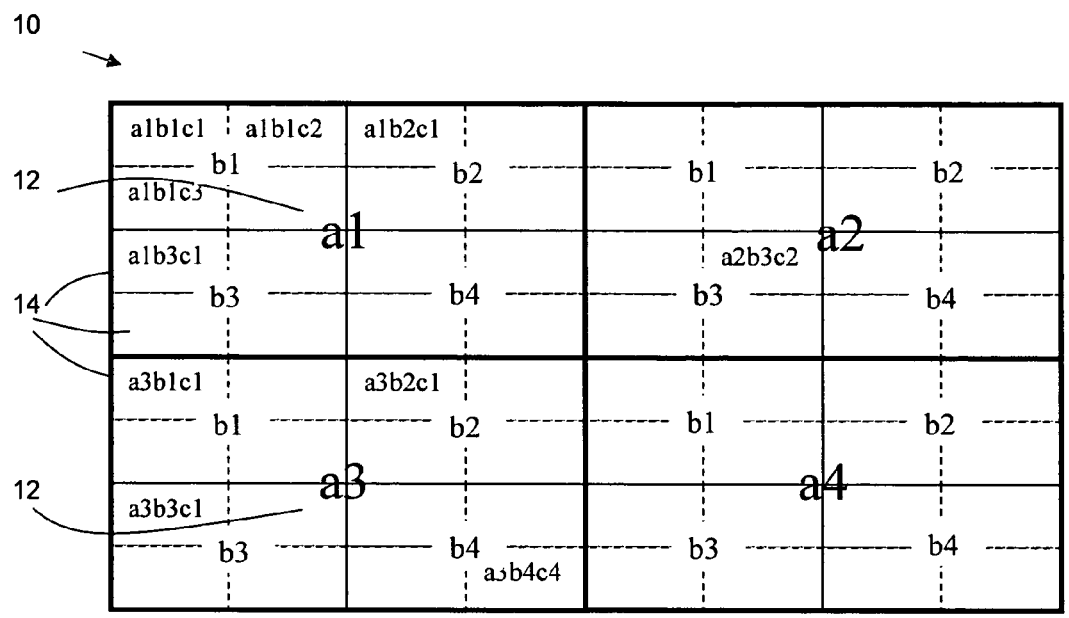
FIG. 2 represents a first plane representing the output produced by an embodiment of the invention.

As illustrated in FIG. 2, a notional two dimensional plane 10 is then divided up into regions 12 corresponding to the discrete values of the first input parameter. In the example of FIG. 2, there are four values of the first input parameter and hence four regions 12. Each of these regions is then divided up into regions 14 corresponding to the discrete values of the second input parameter. Each of the regions 14 is then divided up, in turn, by the discrete values of each subsequent input parameter, up to the last input parameter dividing the plane into a number of sub-regions 16.

The different values of the first input parameter are labelled a1, a2, a3 and a4, the different values of the second b1, b2, b3 and b4, etc. Each sub-region 16 has a different set of values of the input parameters labelled a, b and c, though for clarity only some of the sub-regions are labelled. Note that although FIG. 2 only shows three parameters, in a real example there may be many more parameters and hence a much more finely divided space.

Then, the complexity of the space is estimated for different regions, using the coarse scale of parameters. In the embodiment, the measure of complexity used is the fractal dimension of the sub-space, i.e. the fractal dimension of the subspace of the output parameter and the two dimensional plane used to represent the input parameters. The fractal dimension is a reasonably well known and well defined measure, and more importantly its calculation is computationally efficient. The fractal dimension represents the variability of the output parameter over the region. A space with a lower fractal dimension is "smoother" and is preferred in the embodiment One of two courses of action can then be taken for the complex regions. Firstly, it is possible to provide a finer grid of parameters in the region of higher complexity to obtain an improved estimate in this region.

Alternatively, the complex regions can be ignored in that a small error in input parameter has a significant impact on the output, and solutions sought in different regions of the multi-dimensional space.

In the preferred embodiment, the second approach is adopted and processing aims to seek regions which are locally smooth.

In either alternative, once a region of the two-dimensional space has been identified a finer scale of values for the parameters represented in that region may be selected and processing repeated to home in on a desirable region.

In the event that the smooth region only has a single selected discrete value of a particular parameter, the new values of that parameter may be selected in the range from above the next lower selected discrete value of that parameter to below the next higher selected discrete value of that parameter.

For example, returning to the packaging speed example, if a smooth region is identified with a packaging speed of 5 per minute, the calculation can be repeated with values of the packaging speed of 4, 5, 6 and 8 per minute, all of which values are in the range 2 to 10, the next lower value to the next higher value in the selected discrete values 2, 5, 10, and 50. In this way, the embodiment can home in on a good value of packaging speed As will be appreciated, in the event that there is no lower or higher selected discrete value of that parameter, the maximum or minimum value of the parameter is given by the maximum or minimum value of that parameter. For example, in the example above, if a smooth region was represented by a packaging speed of 2, there is no lower discrete value, and the minimum value 1 is selected instead. Thus, in this case values from 1 to 4 (less than 5) could be selected, for example 1, 2, 3 and 4.

In this way, after several iterations, a smooth region can be identified without excessive computational complexity, since only parameter values similar to parameter values of regions identified in earlier stages are used.

The parameters can be reordered after every iteration, though this is not essential. It can allow a better solution to be found, at the cost of some processing time.

Note that searching for smooth regions and ignoring complex regions goes contrary to conventional analysis. Conventionally, operations analysis has been used to identify maxima or minima, i.e. regions where an output parameter reaches a maximum or minimum value. For example, operations analysis might be used to identify a minimum of a cost function, i.e. the value of input parameters for which the cost is minimal.

Such an approach is superficially attractive but ignores the fact that most models are not exact and further that most real processes cannot be controlled exactly. An extremal value of a parameter such as cost frequently occurs in a region where the output is very sensitive to the input parameters. Thus, a small variation in another parameter results in a much worse performance.

In the embodiment, a visualisation is used, and the complex regions are identified, using a particular colour coding.

A visual display of an output parameter as a function of the input parameters is generated, which represents the same two-dimensional plane 10 as discussed above, divided into the regions and sub-regions as discussed above.

The value of the output parameter for the input parameters represented by each sub-region is then displayed in that sub-region to represent the variation of the output parameter with the input parameters. One way of doing this is to display the two-dimensional plane on display apparatus such as a computer screen and then to colour the sub-region 16 with a colour representing the output value with the corresponding input parameters.

Figure 3:
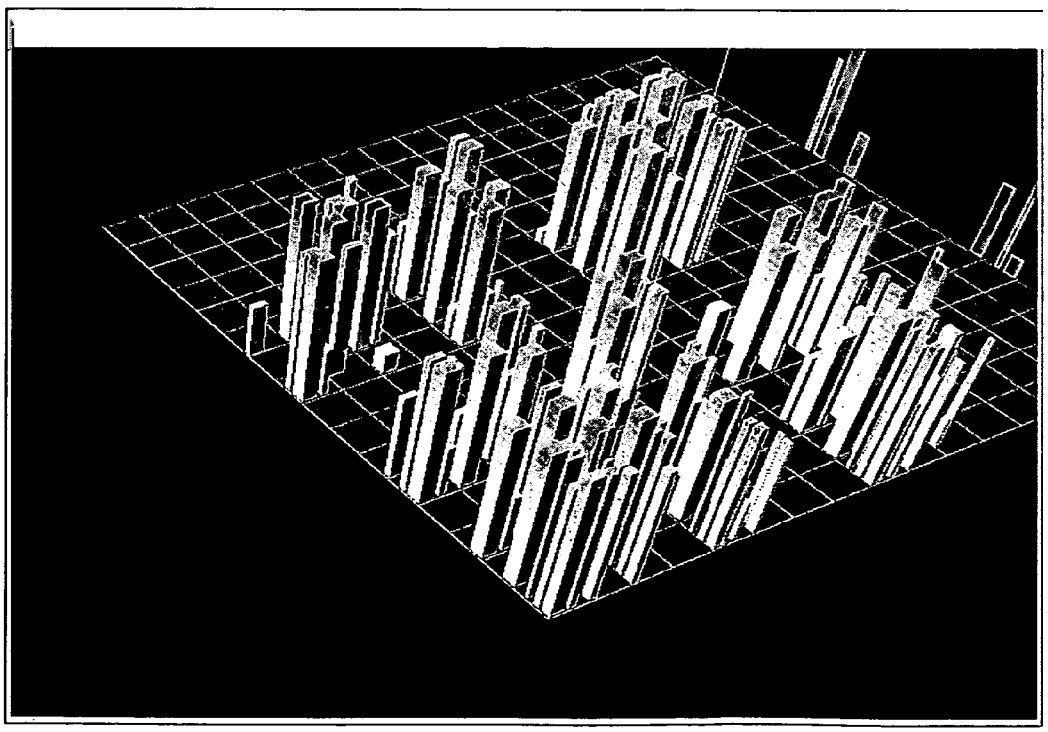
FIG. 3 illustrates the output of the embodiment of the invention.
Figure 4:
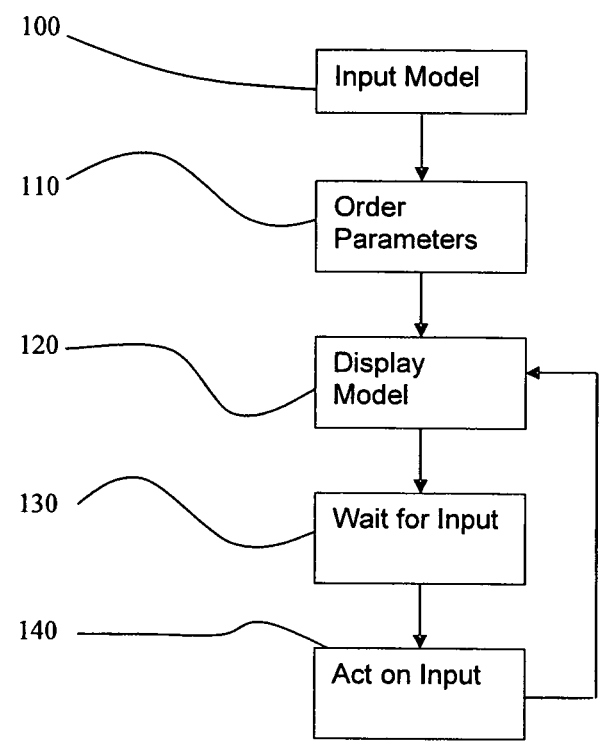
FIG. 4 is a flow chart of a method of the embodiment of the invention.
Figure 5:
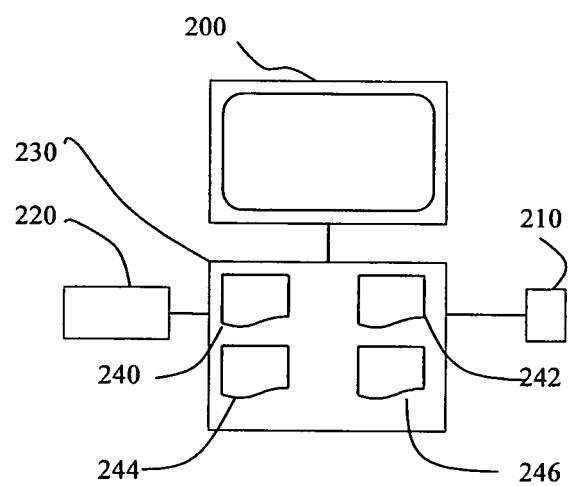
FIG. 5 is a diagram of an apparatus implementing the embodiment of the invention.

An alternative display mode is illustrated in FIG. 3 which shows a plurality of bars 18 each attached to the corresponding sub-region of a two-dimensional plane 10 shown in perspective view. Each bar has a length corresponding to the value of the output parameter.

In a particularly preferred embodiment both colour and bars are used in the display mode of FIG. 3.

The method according to this embodiment allows the choice of display and further allows the display to be spun, translated, and zoomed in and out. Further, the method includes accepting user input to identify regions of the display of interest and getting details of the parameters of those regions.

The appearance of the display will vary considerably depending on the chosen order of input parameters. The first input parameters in the list correspond to large areas of the display, whereas the last input parameters correspond to the fine detail of areas of the display. Thus, a region of the display where the output parameter is similar across the region represents a region of the parameter space defined by the earlier parameters of the list in which variation of the later parameters of the list do not cause much variation in the output parameter.

In one approach, the order of the input parameters can be changed by user input. Thus, in such an embodiment, the method includes accepting user input to specify the order of parameters, and displaying the output parameters as a function of the specified order of input parameters.

In this way, the user can vary the order of input parameters until the user can clearly identify smooth or suitable regions in the displayed space.

Note that smooth regions of the display correspond to regions where variation in the later input parameters in the specified order do not cause significant variation in the output parameters. Thus, the order of parameters provides information about the suitable regions.

In another approach, the input parameters are ordered automatically to show smooth regions. This is essentially a sorting problem to sort the input parameters so that the output graph has regions that are as smooth as possible, by arranging for the last input parameters to be parameters to which the output is relatively insensitive. The smoothness within a region relates to the complexity of the region, where complexity is used in the sense that a complex region is highly sensitive to the input parameters.

In apparatus according to the embodiment both of these approaches are used, as will now be explained.

The initial step (step 100) is to input the model.

Then, the input parameters are sorted automatically (110) to identify a suitable order of parameters. This is essentially a simple sorting step to locate a sorted order of input parameters that most effectively smoothes the displayed result. As explained above, this means ordering the input parameters so that the output is relatively insensitive to the last input parameters in the ordered list.

The display is provided (120) to the user using the sorted order of input parameters. This clusters the output values together.

Next, the apparatus waits (130) for user input. User input is accepted for a number of purposes. Firstly, the user input can change the order of input parameters if the user wishes to change the order. Thus, in the embodiment, the user can select a different order of parameters (and hence a different display) if required. Following the user input, the next step is to act on the input (step 140) which in this case records the new order of parameters and returns to step 120 to display the changes.

Secondly, user input can be provided to rotate the display, to zoom in and out, and to move the display over the whole of the two-dimensional representation. This allows the user to identify smooth candidate regions, and also to identify non-smooth, complex regions which may be avoided. Again, the changes required by the user input are recorded and the model displayed again with the new display parameters.

In this way, the user can readily visualise suitable regions and identify suitable solutions, using the displayed results as well as the user's own knowledge of the problem.

The embodiment can be implemented on apparatus, including a display 200, a user interface such as a mouse 210, a user interface 220 for inputting a file containing an input model, and a computer 230. The computer includes various pieces of code 240, 242,244. In particular, the computer includes code 240 for accepting an input model of a real-world process defining the relationship between a plurality of parameters, including n input parameters which may be varied and at least one output parameter representing an aspect of the quality of the system, where n is at a positive integer at least 2. The computer also includes code 242 to estimate the complexity of regions of the input parameters, wherein the complexity is a measure of the sensitivity of the output parameters to the input parameters. Further, code 244 is provided to locate regions of the model where the output parameter is relatively insensitive to variations in the input parameters, in the embodiment sorting the order of input parameters as discussed above. Code 246 for displaying the results is also provided.

It will be appreciated by those skilled in the art that these pieces of code can be combined into a single program or suite of programs, and the computer 230 may be a single computer, a networked computer, or any processor or group of processors, with the code, memory and processing distributed or concentrated in a number of ways.

The model according to the embodiment includes n input parameters which may be varied and at least one output parameter representing an aspect of the quality of the system, where n is at a positive integer at least 2.

Returning to the example, the user creates the model of the supply chain and inputs it into the computer. Next, the computer automatically orders the input parameters as set out above. The code 246 then causes the computer to output a screen image similar to that of FIG. 2, but much larger, on display 200.

The user then zooms around the image seeking regions of low variation in the output parameter representing useful solutions, and reorders the order of parameters if necessary. The display code 246 in the embodiment is arranged to respond to movements and control signals received from the mouse to reorient the display and reorder the parameters in accordance with user wishes.

The user can use his real-world understanding to select suitable regions that might actually work in practice, using the display which readily represents the model. Thus, the embodiment delivers a system which combines the automatic sorting of the computer and the user's own knowledge, supported by an intuitive display, to allow good solutions optimising the model to be determined.

Thus, the embodiment provides an intuitive support apparatus for allowing a user to identify good solutions to a model problem, where "good" in this context refers to stable solutions, not maxima or minima.

The apparatus and method of the embodiment allow a combination of computer searching and user visualisation which can give better results, and more easily understood results, than simply carrying out an operation analysis computation.

Although a single embodiment has been described, those skilled in the art will realise that many alternatives are possible. In particular, the invention is suitable for use with many model types, computer systems, and displays.

The use of a two-dimensional plane of input parameters in the display representation is convenient, since together with the output parameter this gives a three-dimensional output which can readily be visualised by a human user. However, it is also possible to use spaces of other dimensionality together with visualisation tools allowing these spaces to be represented.

The embodiment described above calculates the fractal dimension based on the same two-dimensional sub-space plane used to display the data. However, those skilled in the art will realise that the same data can be represented with sub-spaces of different dimensionality, and the invention is applicable to the use of any of these representations. Although the embodiment described above uses the same representation for the smoothness calculation as for the display, to save processing, this is not strictly essential.

For example, the method can be used to calculate matters such as the number and even location of tills operated over time in a store, the number of parking spaces provided outside a shopping mall, or the best route to take to reach a destination through a public transport network. In all these applications, a stable and reliable solution is generally to be preferred over a calculated "optimal" solution that in the real world is very unlikely to actually be achieved.

Further, the method can be used with multiple output parameters; a user can for example switch between views of different output parameters. The smoothness calculation can be based in this instance on a combination of the smoothness of the different output parameters, for example an average, or a weighted average, or any suitable combination.

The invention claimed is:

1. An analysis method, comprising:
accepting an input model of a real-world process defining a relationship between a plurality of parameters, including n input parameters which may be varied and at least one output parameter representing an aspect of an output of the real-world process, where n is a positive integer;
defining a two-dimensional (2D) plane that is divided into a first plurality of regions corresponding to a subset of possible values of a first one of the input parameters, wherein each of the regions in the first plurality is further divided into a second plurality of regions corresponding to a subset of possible values for a second one of the input parameters;
estimating a sensitivity of the at least one output parameter to the input parameters in a plurality of the regions
locating at least one region where the at least one output parameter is substantially insensitive to variations in the input parameters; and
wherein the accepting, defining, estimating, and locating are performed by at least one computer.

2. An analysis method according to claim 1, wherein sensitivity of the at least one output parameter to the input parameters in a region is estimated by calculating a fractal dimension of a subspace corresponding to the region.

3. An analysis method according to claim 1 or 2, further comprising:
ordering the input parameters in an initial order from a first input parameter to a last input parameter;
varying values of the input parameters in order starting with the first input parameter and ending with the last input parameter, wherein at least some of the input parameters take a plurality of values in turn, and calculating a value of the at least one output parameter for each set of the values of the input parameters;
varying the initial order of input parameters; and
identifying a final order of input parameters having a set of earlier input parameters being the first m input parameters, where m is a positive integer at least 2 and less than n, and having a set of later input parameters being a remainder of the n input parameters, wherein the final order of input parameters results in at least one region corresponding to a set of values of the m earlier input parameters in which variation of the later input parameters varies the at least one output parameter less than variation of at least 90% of other sets of values of the m earlier input parameters.

4. An analysis method according to claim 3 further comprising defining more values of input parameters in regions of high complexity and repeating the analysis to provide further analysis in complex regions.

5. An analysis method according to claim 3 further comprising outputting sets and/or ranges of values of the input parameters for which the at least one output parameter shows similar values.

6. An analysis method according to claim 3, further comprising:
identifying a region corresponding to a first set of values of the input parameters for which sensitivity of values of the at least one output parameter to the input parameters is small;
selecting new values of the input parameters corresponding to the identified region; and
identifying a region corresponding to the new values of the input parameters where the at least one output parameter is substantially insensitive to variations in the input parameters.

7. An analysis method according to claim 6 including repeating the steps of: identifying a region of the input parameters for which the sensitivity of the values of the at least one output parameter to the input parameters is small; selecting new values of the input parameters corresponding to the identified region; and identifying a region corresponding to the new values.

8. An analysis method according to claim 1 further comprising:
displaying results for an ordered set of input parameters from a first input parameter to a last input parameter, at least some of the parameters taking a plurality of values by:
displaying the two-dimensional plane; and
displaying an indication of a value of the at least one output parameter as a function of the input parameters at each region in the two-dimensional plane corresponding to the input parameters.

9. An analysis method according to claim 8 wherein displaying an indication of the value of the at least one output parameter includes displaying a color representing the at least one output parameter at the corresponding region in the two-dimensional plane.

10. An analysis method according to claim 8 or 9 wherein displaying an indication of the value of the at least one output parameter includes displaying a perspective view of the two-dimensional plane with a bar at each region having a length representing the value of the at least one output parameter.

11. An analysis method according to claim 10 further including accepting user input to change an order of the input parameters, and displaying results for the changed order of input parameters.

12. An analysis method according to claim 1 further comprising operating the real world process with values of the input parameters corresponding to the located at least one region.

13. A non-transitory computer program product, arranged to interact with a computer, the computer program product configured to perform a method when executed by the computer, the method comprising:
   accepting an input model of a real-world process defining a relationship between a plurality of parameters, including n input parameters which may be varied and at least one output parameter representing an aspect of quality of the real-world process, where n is a positive integer;
   defining a two-dimensional (2D) plane that is divided into a first plurality of regions corresponding to a subset of possible values of a first one of the input parameters, wherein each of the regions in the first plurality is further divided into a second plurality of regions corresponding to a subset of possible values for a second one of the input parameters;
   estimating complexity of the regions, wherein the complexity is a measure of sensitivity of the at least one output parameter to the input parameters; and
   locating regions where the at least one output parameter is substantially insensitive to variations in the input parameters.

14. A non-transitory computer program product according to claim 13, wherein the method further comprises: displaying results for an ordered set of input parameters by displaying the two-dimensional plane, and displaying an indication of a value of the at least one output parameter as a function of the input parameters at each region in the two-dimensional plane corresponding to the input parameters.

15. An analysis apparatus, comprising
   a display;
   a user interface means; and
   a controller, arranged to:
   accept an input model of a real-world process defining a relationship between a plurality of parameters on the user interface means, the model including n input parameters which may be varied and at least one output parameter representing an aspect of quality of the real-world process, where n is a positive integer; define a two-dimensional (2D) plane that is divided into a first plurality of regions corresponding to a subset of possible values of a first one of the input parameters, wherein each of the regions in the first plurality is further divided into a second plurality of regions corresponding to a subset of possible values for a second one of the input parameters;
   estimate complexity of the regions, wherein the complexity is a measure of sensitivity of the at least one output parameter to the input parameters; and identify regions where the at least one output parameter is substantially insensitive to variations in the input parameters.

16. An analysis apparatus according to claim 15, further comprising:
   wherein the controller is configured to order the input parameters from a first input parameter to a last input parameter; and wherein the controller is configured to cause the display to display results for an ordered set of input parameters by displaying the two-dimensional plane, and displaying an indication of a value of the at least one output parameter as a function of the input parameters at each region in the two-dimensional plane corresponding to the input parameters.

\* \* \* \* \*